No. 881,421.

PATENTED MAR. 10, 1908.

J. C. LEHMANN.
HOOK FOR LACINGS.
APPLICATION FILED MAY 4, 1906.

Witnesses:
Samuel C. Pearce
John F. Hotch

Inventor
Julius C. Lehmann
By Dyer & Dyer
Attorneys.

UNITED STATES PATENT OFFICE.

JULIUS C. LEHMANN, OF NEW YORK, N. Y., ASSIGNOR OF ONE-FIFTH TO H. W. AYLWARD, ONE-FIFTH TO J. J. AYLWARD, AND ONE-FIFTH TO J. SCHLAGEL, OF NEW YORK, N. Y.

HOOK FOR LACINGS.

No. 881,421.　　　　Specification of Letters Patent.　　　Patented March 10, 1908.

Application filed May 4, 1906. Serial No. 315,123.

*To all whom it may concern:*

Be it known that I, JULIUS C. LEHMANN, a citizen of the United States, residing in the borough of Brooklyn, county of Kings, city and State of New York, have invented a certain new and useful Improvement in Hooks for Lacings, of which the following is a specification.

The object I have in view is the production of a hook for lacing shoes, garments, belts, and other fabrics and structures together, and which will possess superior advantages. Some of these advantages which I obtain are the reduction of wear on that part of the lacing within the hook, the reduction of friction of the lacing within the hook, and the provision for an elastic support for the lacing within the hook whereby the lacing may be held under elastic tension.

Figure 1:
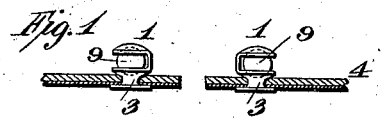
Figure 2:
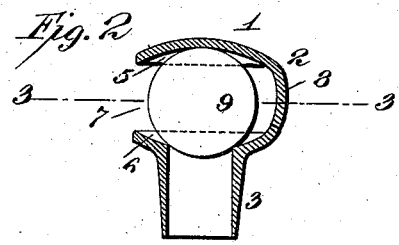
Figure 3:
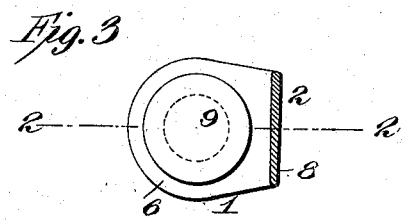
Figure 4:
Figure 5:
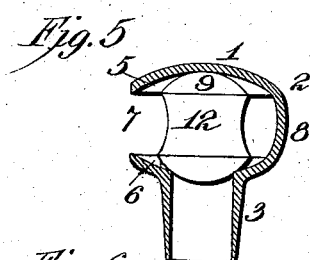
Figure 6:
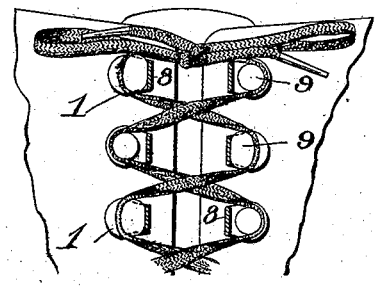

I attain the objects of this invention by means of the accompanying drawings, which show several embodiments of the invention, and in which Figure 1 represents two fabrics or belts or pieces of garment, with hooks on opposing edges. Fig. 2 is an enlarged sectional view taken on the line 2—2 of Fig. 3; and showing one form of hook as it appears before being riveted in place. Fig. 3 is a horizontal section thereof, on the line 3—3 of Fig. 2, and showing the ball in full lines. Fig. 4 is a view similar to Fig. 2, but of a modification. Fig. 5 is a view of another modification, and Fig. 6 is a view showing the lacing applied to a shoe.

In all the views, like parts are designated by the same reference characters.

In carrying out my invention, I provide a hook, as 1, which is preferably formed of metal. This hook comprises a body 2, and a shank 3, the hook being preferably made of sheet metal stamped to shape. The shank 3 is passed through the support 4, which may be the fabric, portion of shoe, garment, belt, etc., which is to carry the hook, and riveted thereunder so as to be securely held in place. The top of the body of the hook is formed with a cavity 5 and the bottom with a cavity 6. Separating these cavities and on the front and sides of the hook is an opening, 7. The other side of the hook is in the form of a solid metal back 8 which serves as a support for the top of the hook. Within the body of the hook is an elastic means, such means being preferably rotary. One form of device is a ball 9. This ball is made of elastic material, preferably soft rubber molded to shape. The diameter of the ball is greater than the width of the opening 7, and is preferably large enough so as to rest, but without tension, upon the top and bottom of the cavities 5 and 6. It may be introduced through the opening 7, by compressing it through the same, so that it will rest within the cavities 5 and 6 of the body of the hook, and will be held in place by its own elasticity.

In use, the lacing is introduced within the opening 7, and rests against the ball 9. If the lacing be applied sufficiently tight, it will force the ball 9 against the back 8 of the hook, distorting the ball and putting it under tension. If the laces are of inelastic material, this will impart a certain amount of elasticity to the lacing as a whole. This is of advantage in many situations, particularly in the lacing of shoes, which may be laced tight at certain times, and will remain tightly laced even though the strain upon the lacing becomes less. The sliding movements of the lacing will rotate the ball 9, and prevent the lacing from coming in contact with the edges of the back 8, and thereby becoming worn or frayed. It will be seen that the ball 9 serves a three-fold purpose: (1) It imparts elasticity to the lacing; (2) acting as it does, it forms a rotating support for the lacing, reducing friction; (3) it prevents wear of the lacing upon the edges of the back of the hook. The ball must be distorted to be slipped through the opening 7. While resting within the cavities 5 and 6 of the body, it will be held firmly in position, and cannot easily be removed. If it wears out another ball may be introduced without the need of special tools or appliances.

The invention may be modified in many ways, one modification being shown in Fig. 4. In this modification, in place of the ball 9 is a pulley 10, having a central shaft 11. The pulley and shaft may be made of rubber or other elastic material, or the pulley may be made of inelastic material, and the shaft of elastic material. The face of the pulley is shown as having a groove which may assist in retaining the lace within the hook as shown in Fig. 5. For the same reasons, the ball 9 in Figs. 1 and 2 could also be provided with a peripheral groove.

Having now described my invention, what

I claim as new and desire to secure by Letters Patent, is:

1. As a new article of manufacture, a lacing hook having a ball of elastic material within the body thereof against which the lacing engages while under tension.

2. As a new article of manufacture, a lacing hook having a body and rotary elastic means within the body, the said means being free to rotate within the body by engagement with the lacing while under tension.

3. As a new article of manufacture, a lacing hook having elastic means within the body thereof against which the lacing engages while under tension.

4. As a new article of manufacture, a lacing hook having a hollow hook-like body and an elastic ball imprisoned therein, the said ball being adapted to be engaged and compressed by the lacing while the latter is under tension.

5. As a new article of manufacture, a lacing hook having a hollow hook-like body and an elastic ball imprisoned therein and free to turn in all directions, the said ball being adapted to be engaged by the lacing and distorted by the pressure on the latter while under tension.

6. As a new article of manufacture, a lacing hook having a hollow hook-like body which has a peripheral opening and with a soft rubber ball within the body, the diameter of the ball being greater than the width of the opening.

7. As a new article of manufacture, a lacing hook having a hollow hook-like body which has a peripheral opening, and with a soft rubber member within the body, the diameter of the member being greater than the width of the opening.

This specification signed and witnessed this third day of May, 1906.

JULIUS C. LEHMANN.

Witnesses:
JOHN L. LOTSCH,
AUG. LONG.